Feb. 18, 1930. T. VISOTA 1,747,534
PISTON FOR EXPLOSION MOTORS
Filed Oct. 6, 1927
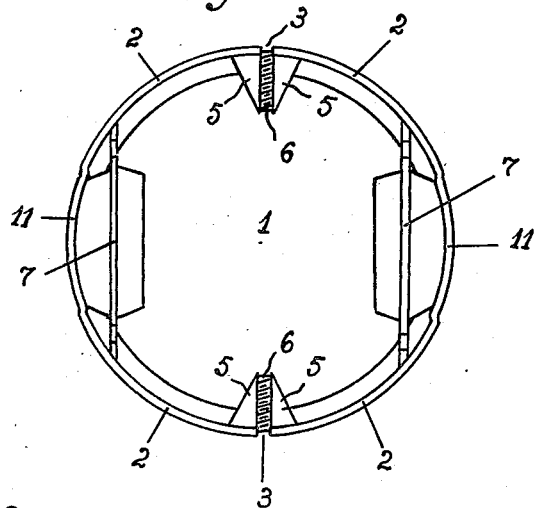
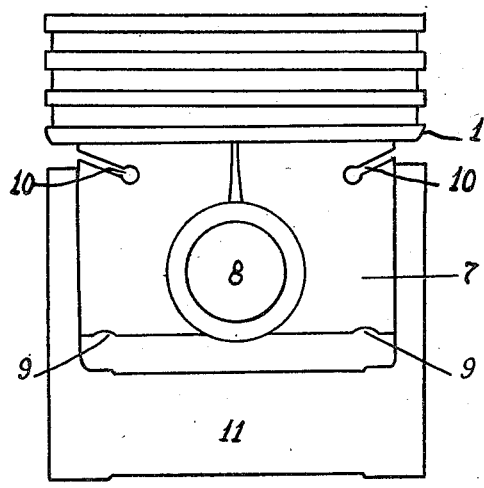
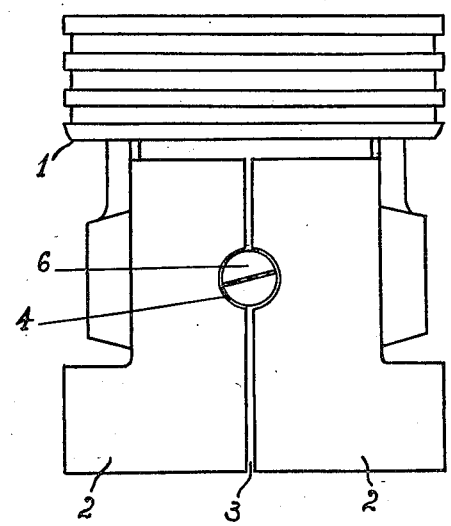
T. Visota
INVENTOR
By Marks & Clark
Attys.

Patented Feb. 18, 1930

1,747,534

UNITED STATES PATENT OFFICE

TARAS VISOTA, OF BUENOS AIRES, ARGENTINA

PISTON FOR EXPLOSION MOTORS

Application filed October 6, 1927, Serial No. 224,467, and in Argentina August 4, 1927.

The present invention refers to important improvements in pistons for explosion motors, and has for object to increase the durability of said pistons, five times in relation to pistons known until now. In order to obtain this result, I provide the common pistons with a system of regulation which permits the increase of the volume of the pistons in accordance with the wear suffered during their operation. This improvement is obtained with a simple modification adapted to common pistons, and which will be described in the following:

For the better understanding of the invention, this description is illustrated by the accompanied drawings, in which the respective numbers indicate the same visible parts in the various figures.

Fig. 1 is an exterior view of the piston demonstrating the regulation, object of the present invention.

Fig. 2 is a view in plan of the interior of the piston, showing the system of regulation of the invention.

Fig. 3 is an external view of the piston showing the modifications introduced in the walls where the bolt of the piston passes.

As it can be seen in these drawings, in the walls 2 of the piston 1 is a vertical cut 3. In these walls 2, is a hole 4, which terminates into a threaded cone-shaped aperture 6 and a threaded cone shaped member 6 is adapted to screw therein.

The wrist pins are adapted to pass through apertures 8 in the walls 7 which are constructed as illustrated in Fig. 3, the upper part of which is provided with ribs. Such an arrangement as shown in Fig. 3 offers less resistance to the piston expansion which is effected by the adjustment of the conical member 6.

Furthermore the two parts 11 of the piston have less diameter in order that they have no friction when the piston is traveling.

Now relating to the working of my system of regulation, the object of my invention, may serve the following:

When the piston is worn out immediately and with the help of a screw driver or any other suitable key, the two screws 6 are turned which due to their conical form and as they screw themselves into the cones 5 the space in the cuts 3 is increased and for this the volume of the piston will also be increased. As it will be easily understood, in this form it is possible to adjust the pistons every time that they need it, an operation which can be repeated until the piston is absolutely worn out and wasted.

Special attention is called to the fact that the invention resides especially in the circumstance to produce the vertical cuts 3 and to provide conical screws 6 with their cones 5 permitting the extension of the piston at any rate, being able to provide said cones and screws in any suitable place of the piston in connection with the incisions or cuts 3, being the illustrations in the annexed drawings one of the preferred forms of the application of the invention.

I claim:

1. A piston comprising a head having a skirt provided with longitudinal slots forming a pair of expansible sections, the adjacent edges of said sections being provided with coned threaded apertures, said piston having bores forming wrist pin bearings and the walls adjacent said bores having a plurality of rills in the upper corners, and threaded conically shaped members adapted to be screwed in said coned threaded apertures for effecting an increase in the diameter of the skirt.

2. A piston comprising a head having a skirt provided with oppositely disposed longitudinal slots forming a pair of expansible sections, the adjacent edges of said sections being provided with coned threaded apertures, and threaded conically shaped members adapted to be screwed in said coned threaded apertures for effecting an increase in the diameter of the skirt.

In testimony whereof I affix my signature.

TARAS VISOTA.